United States Patent
Li

(10) Patent No.: US 9,768,823 B1
(45) Date of Patent: Sep. 19, 2017

(54) CONVERTIBLE DATA CARRIER CRADLE FOR ELECTRONIC MOBILE DEVICE

(71) Applicant: Giesecke & Devrient Mobile Security America, Inc., Dulles, VA (US)

(72) Inventor: Yongjia Li, Ashburn, VA (US)

(73) Assignee: Giesecke & Devrient Mobile Security America, Inc., Dulles, VA (US)

( * ) Notice: Subject to any disclaimer, the term of this patent is extended or adjusted under 35 U.S.C. 154(b) by 0 days.

(21) Appl. No.: 15/293,882

(22) Filed: Oct. 14, 2016

Related U.S. Application Data

(63) Continuation-in-part of application No. 15/236,772, filed on Aug. 15, 2016, now Pat. No. 9,647,709.

(51) Int. Cl.
| | |
|---|---|
| H04B 1/38 | (2015.01) |
| H04M 1/00 | (2006.01) |
| G08B 13/14 | (2006.01) |
| H04B 1/3888 | (2015.01) |
| H04M 1/11 | (2006.01) |

(52) U.S. Cl.
CPC ............ *H04B 1/3888* (2013.01); *H04M 1/11* (2013.01)

(58) Field of Classification Search
CPC ...... H04B 1/18; H04B 1/3816; H04B 1/3883; H04M 1/00; H04M 1/0262; H04M 1/0214; G08B 13/14; H01Q 1/243; H01Q 7/00; H01Q 1/242; G06K 19/07773
See application file for complete search history.

(56) References Cited

U.S. PATENT DOCUMENTS

| | | | | |
|---|---|---|---|---|
| 6,923,373 B2 * | 8/2005 | Kanagawa | ............ | G06K 13/08 235/441 |
| 7,086,887 B2 * | 8/2006 | Tsai | ..................... | H01R 4/5066 439/160 |
| 7,445,476 B2 | 11/2008 | Ujii et al. | | |
| 7,597,566 B2 * | 10/2009 | Peiker | .................... | G06K 13/08 439/131 |
| 7,734,279 B2 * | 6/2010 | Fantini | ................ | H04L 63/0853 370/230 |
| 7,764,977 B2 * | 7/2010 | Kemppinen | ......... | H04B 1/3816 235/461 |
| 8,150,466 B2 | 4/2012 | Park et al. | | |
| 8,382,059 B2 | 2/2013 | Le Gette et al. | | |
| 8,968,029 B2 | 3/2015 | Yun | | |
| 9,002,421 B2 | 4/2015 | Choi | | |

(Continued)

*Primary Examiner* — Pablo Tran
(74) *Attorney, Agent, or Firm* — Drinker Biddle & Reath LLP

(57) ABSTRACT

A data carrier is convertible into a cradle for a mobile communications device. The data carrier includes a first manipulation line downstream of a cutout in which the SIM is disposed. The first manipulation line and vertical manipulation lines define a stand that is less than a width of the card body. A support portion on each side of the stand includes a rear support surface that is fixed relative to manipulation of the stand. Each support portion also includes second manipulation and third manipulation lines configured such that upon manipulation, a vertical support surface extends between the second and third manipulation lines and a lip portion extends between the third manipulation line and a first end of the card body. The mobile communications device may be secured in a portrait orientation within the cradle formed by the rear support surfaces, the vertical support surfaces, and the lip portions.

20 Claims, 18 Drawing Sheets

(56) References Cited

U.S. PATENT DOCUMENTS

| | | |
|---|---|---|
| 9,267,638 B2 | 2/2016 | Le Gette et al. |
| 2003/0227763 A1* | 12/2003 | Kao ................... G06K 7/0021 |
| | | 361/818 |
| 2010/0267419 A1 | 10/2010 | Nishizawa et al. |
| 2010/0304758 A1 | 12/2010 | Bury |
| 2014/0199875 A1 | 7/2014 | Choi et al. |
| 2015/0190648 A1 | 7/2015 | Fischell et al. |
| 2016/0198827 A1* | 7/2016 | Zibkoff Knoll ........ A45C 13/02 |
| | | 150/118 |
| 2016/0363258 A1* | 12/2016 | Le Gette ................ F16M 13/00 |

\* cited by examiner

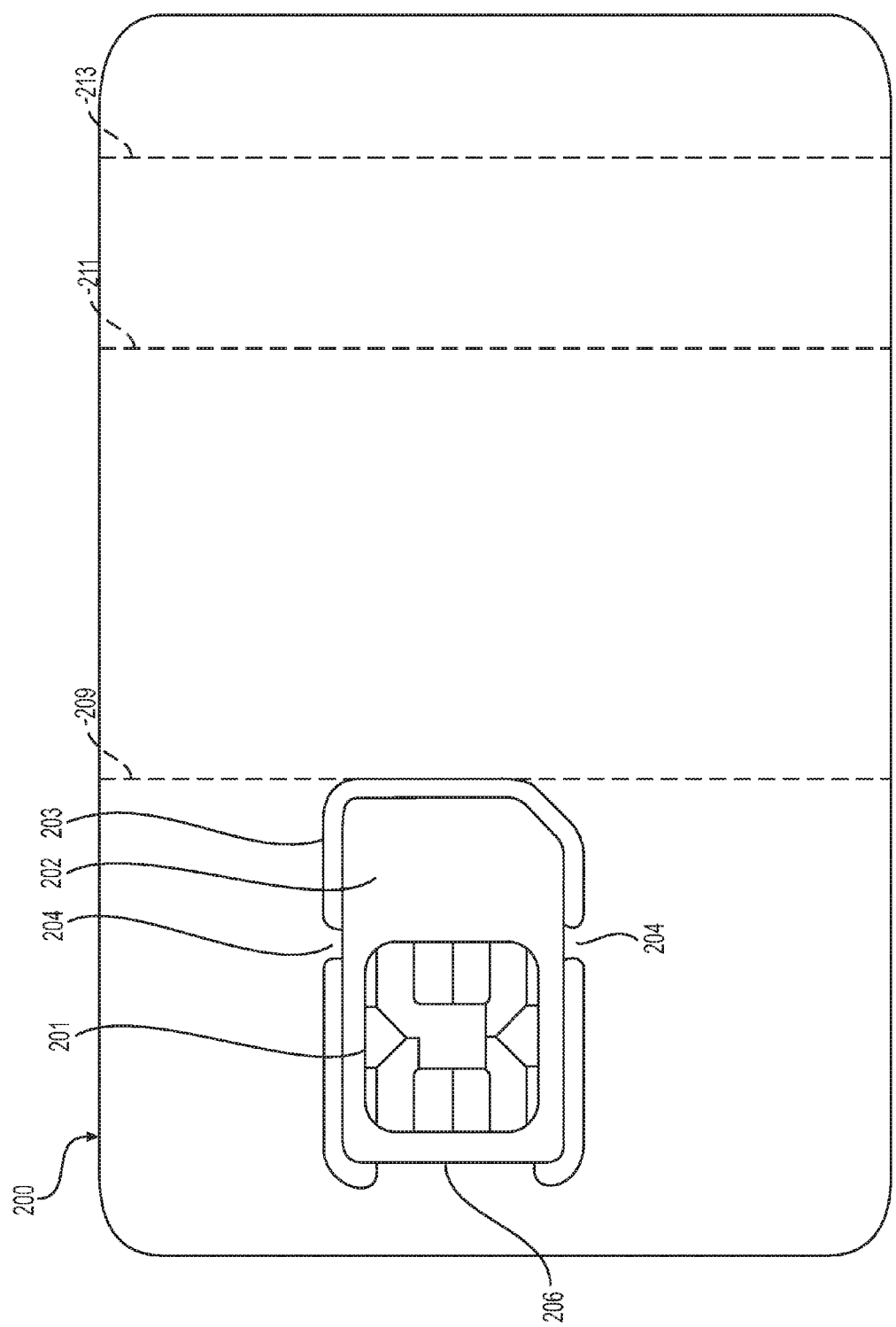

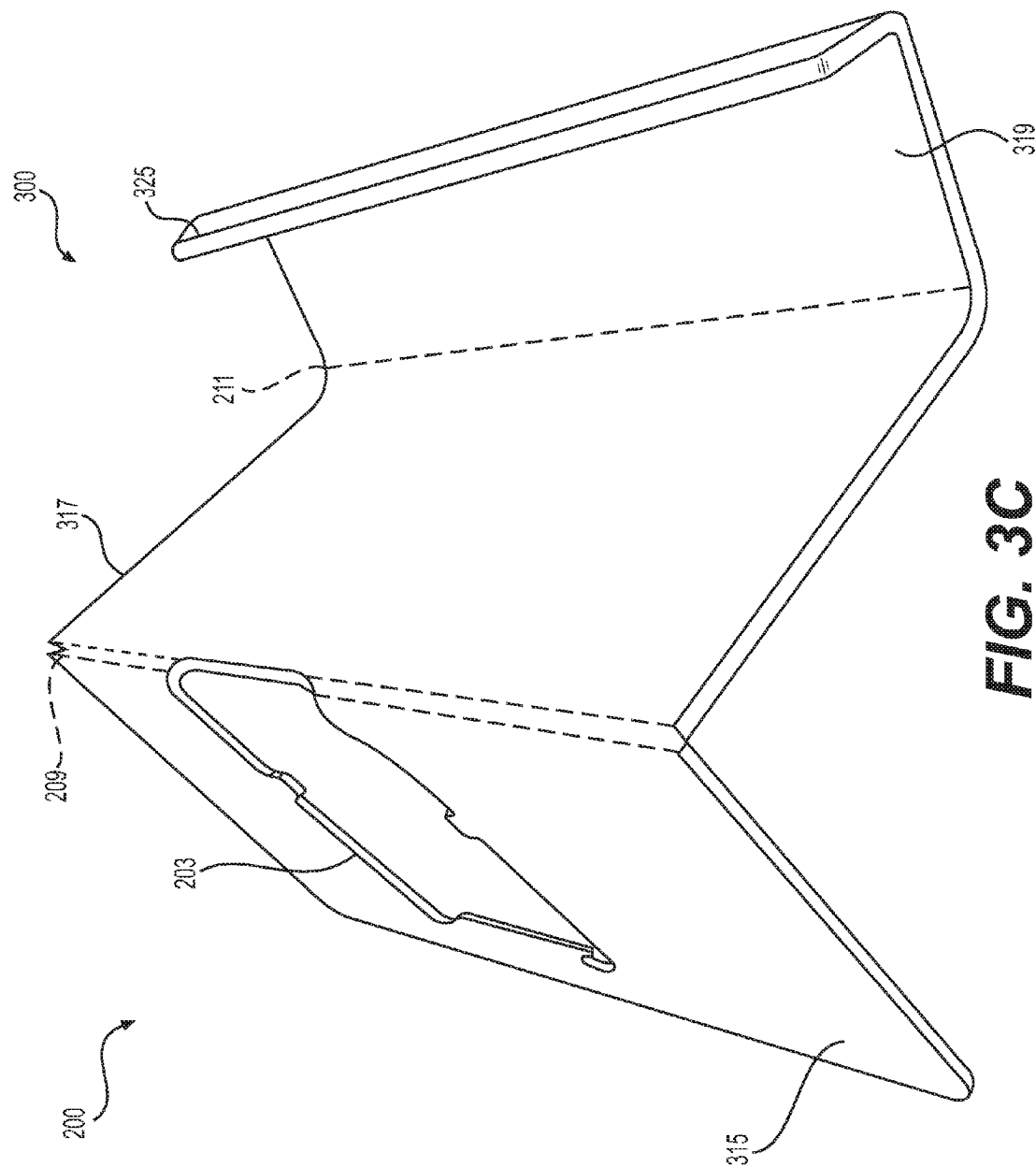

CONVERTIBLE DATA CARRIER CRADLE FOR ELECTRONIC MOBILE DEVICE

This is a continuation-in-part application that claims priority to U.S. patent application Ser. No. 15/236,772, filed Aug. 15, 2016, the disclosure of which is incorporated by reference in its entirety.

TECHNICAL FIELD

The present disclosure relates generally to a data carrier that is convertible for use as a cradle or holder for an electronic device, such as a smartphone.

BACKGROUND

Contemporary mobile electronic communication devices, such as smartphones or feature phones, permit users to communicate with a service provider over a network. These mobile communication devices are often equipped with a module card that includes an integrated circuit, such as a subscriber identity module (SIM) or a universal integrated circuit card (UICC), held on a removable card commonly referred to as a SIM card. These SIM cards can be transferred between different mobile communications devices, such as smartphones or feature phones. A SIM card may include a unique Integrated Circuit Card Identifier ("IC-CID"), International Mobile Subscriber Identity (IMSI) number, and other security features that are used to identify and authenticate subscribers and their mobile communications devices on wireless communication networks.

The original full-size SIM cards (1FF) were the same size as a credit card (ID-1 format: 85.60 mm×53.98 mm×0.76 mm). Over time as mobile communications devices became more advanced, SIM cards were reduced in size to mini-SIM (2FF), micro-SIM (3FF), and even nano-SIM form (4FF) factors, for example. As shown in FIG. 1, the electrical contact 101 of the SIM for each of these SIM card form factors is the same, and thus these smaller SIM card form factors often come embedded in a full size (1FF) ID-1 Format data carrier 100 made of plastic, which includes templates for each form factor 103 (2FF), 105 (3FF), 107 (4FF). In FIG. 1, all of the templates are shown removed from data carrier 100 such that a nano-SIM card comprising form factor 107 and electrical contact 101 for a SIM or UICC is provided. After the desired form factor SIM card is removed from a cutout 104 of data carrier 100 and inserted into a particular mobile communications device, it becomes waste. The flexibility of SIM card is desired by users and wireless service providers, especially in view of the rise of prepaid wireless segment in which users provide their own devices. Given the billions of users of mobile communications devices, it is desirable to reduce this waste by providing an alternative function for the leftover ID-1 format data carriers.

One such alternative function is that the data carrier may be converted into a cradle for holding a mobile communications device. Such an application is particularly useful where the mobile communications device is a smartphone that can be used for viewing video. One example of such a device is depicted in U.S. Pat. No. 9,267,638, which includes a form fitting backplate that approximates the size and shape of the electronic device and includes a separate stand member to hold the device in an upright position for viewing video. With the basic form of the ID-1 Format data carrier, however, the size of the card is fixed and there is no structure for a separate stand member. It would be advantageous to provide a mechanism and a method for converting the basic structure of the ID-1 Format data carrier of a fixed size into a cradle for a specific type of mobile communications device.

SUMMARY OF THE INVENTION

According to aspects of the present disclosure, there is a data carrier configured to be converted into a cradle for a mobile communications device. The data carrier includes a card body comprising a first end and a second end along a particular direction and a first side and a second side along a further direction. The card body has a cutout disposed closer to the first end than the second end along the particular direction. The card body also includes a first manipulation line extending along the further direction at a position downstream of the cutout relative to the first end in the particular direction. The first manipulation line defines a stand portion extending from the first end to the first manipulation line, and the first manipulation line is less than a width of the card body and overlaps a center axis of the card body along a length of the card body. Support portions are disposed on opposite ends of the stand portion along the further direction. Each support portion includes a rear support surface that is configured to be fixed relative to a manipulation of the stand portion along the first manipulation line. The length of each of the support portions is defined by a respective vertical manipulation line defining the length of the stand portion in the particular direction. These support portions each comprises a second manipulation line extending along the further direction of the card body upstream of the first manipulation line relative to the first end in the particular direction. Each support portion also includes a third manipulation line extending along the further direction of the card body upstream of the second manipulation line relative to the first end in the particular direction. The lip portion extends from the third manipulation line to the first end along the particular direction, and the vertical support surface extends from the second manipulation line to the third manipulation line along the particular direction. The length of the lip portion is less than a length of the vertical support surface. A removable SIM card is disposed within the cutout and is connected to the card body by at least one fixing portion. In order to form a cradle, the card body is configured to be manipulated about the first manipulation line so that the stand portion forms a stand such that an end of the stand portion proximate the first manipulation line is elevated relative to the first end of the card body. The card body also is configured to be manipulated about the second manipulation line so that each of the vertical support surfaces is configured to support a bottom surface of the mobile communications device and each of the rear support surfaces is configured to support a rear surface of the mobile communications device. In addition, the card body is configured to be manipulated about the third manipulation line so that the lip portion is configured to secure the mobile communications device within the cradle formed by the rear support surfaces, the vertical support surfaces, and the lip portions.

According to other aspects of the present disclosure, there is a method of forming a cradle for from a data carrier comprising a card body. The method includes providing the card body, which has a first end and a second end along a particular direction and a first side and a second side along a further direction. The card body includes a cutout disposed closer to the first end than the second end along the particular direction. The card body also includes a first manipulation line extending along the further direction at a position downstream of the cutout relative to the first end in the particular direction. The first manipulation line defines a stand portion extending from the first end to the first manipulation line, and the first manipulation line is less than a width of the card body and overlaps a center axis of the card body along a length of the card body. Support portions are disposed on opposite ends of the stand portion along the further direction. Each support portion includes a rear support surface that is configured to be fixed relative to a manipulation of the stand portion along the first manipulation line. The length of each of the support portions is defined by a respective vertical manipulation line defining the length of the stand portion in the particular direction. These support portions each comprises a second manipulation line extending along the further direction of the card body upstream of the first manipulation line relative to the first end in the particular direction. Each support portion also includes a third manipulation line extending along the further direction of the card body upstream of the second manipulation line relative to the first end in the particular direction. The lip portion extends from the third manipulation line to the first end along the particular direction, and the vertical support surface extends from the second manipulation line to the third manipulation line along the particular direction. The length of the lip portion is less than a length of the vertical support surface. A removable SIM card is disposed within the cutout and is connected to the card body by at least one fixing portion. The card body is manipulated about the first manipulation line to form a stand with the stand portion wherein an end of the stand portion proximate the first manipulation line is elevated relative to the first end of the card body. The card body is also manipulated about the second manipulation line to form vertical support surfaces that support a bottom surface of the mobile communications device and each of the rear support surfaces supports a rear surface of the mobile communications device. In addition, the card body is manipulated about the third manipulation line to form a lip portion that secures the mobile communications device within the cradle formed by the rear support surfaces, the vertical support surfaces, and the lip portions.

According to yet other aspects of the present disclosure, there is a method of forming a charging cradle for a mobile communications device from a data carrier comprising a card body. The method includes providing the card body comprising a first end and a second end along a particular direction and a first side and a second side along a further direction. The card body includes a support surface including a plug accommodation portion configured to permit prongs of a power plug to pass through the card body into an electrical outlet. The card body also includes a cutout that is disposed closer to the second side of the card body than the plug accommodation portion along the further direction. The card body further includes a first manipulation line extending along the particular direction at a position of the card body at or beyond an end of the cutout opposite the first side, the first manipulation line defining a lip portion extending from the first manipulation line to the second side. In addition, the card body includes a second manipulation line extending along the particular direction at a position of the card body closer to the first side than the first manipulation line along the further direction, the second manipulation line defining a vertical support surface extending from the first manipulation line to the second manipulation line. To form the charging cradle, the card body is manipulated about the first manipulation line to form the lip portion that holds a mobile communications device between the lip portion and a surface in which the electrical outlet is disposed. The card body is also manipulated about the second manipulation line so that the vertical support surface supports a side of the mobile communications device between the electrical outlet surface and the lop portion. The power plug is connected to the mobile communications device and the prongs of the plug are inserted through the plug accommodation portion to electrically connect the mobile communications device to the electrical outlet. When the prongs are plugged into the outlet, the support portion is secured between the electrical outlet and the power plug to support the mobile communications device at an elevated position above the plugged-in prongs.

By providing a data carrier that may be converted into a cradle for the mobile communication device it was provided with, the amount of waste is greatly reduced since the data carrier may be repurposed. Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 2A is a plan view of an ID-1 Format data carrier with an embedded SIM according to an embodiment of the invention.

FIGS. 3A-3C are perspective views of the ID-1 Format data carrier of FIG. 2A at different stages of the conversion to a cradle for supporting an electronic mobile device.

DETAILED DESCRIPTION OF THE INVENTION

The popularity of mobile communication devices, such as smartphones, has exploded in part because such devices can be used as portable video players capable of showing high definition video. Such smartphone devices are also used for voice and data transmissions over wireless communication networks. Over the last 25 years, authentication of such devices on wireless communication networks is performed using SIMs and UICCs (collectively, "SIMs"). As noted above, original SIMs (1FF) were the size of a credit card but contemporary mobile communication devices use smaller SIM card formats such as the mini-SIM (2FF), micro-sim (3FF), and nano-SIM (4FF). SIMs are backward compatible and are often provided embedded on a full size (1FF) data carrier with one or more cutouts so that the SIM card may be configured to the correct form factor for a particular mobile device.

Figure 1:
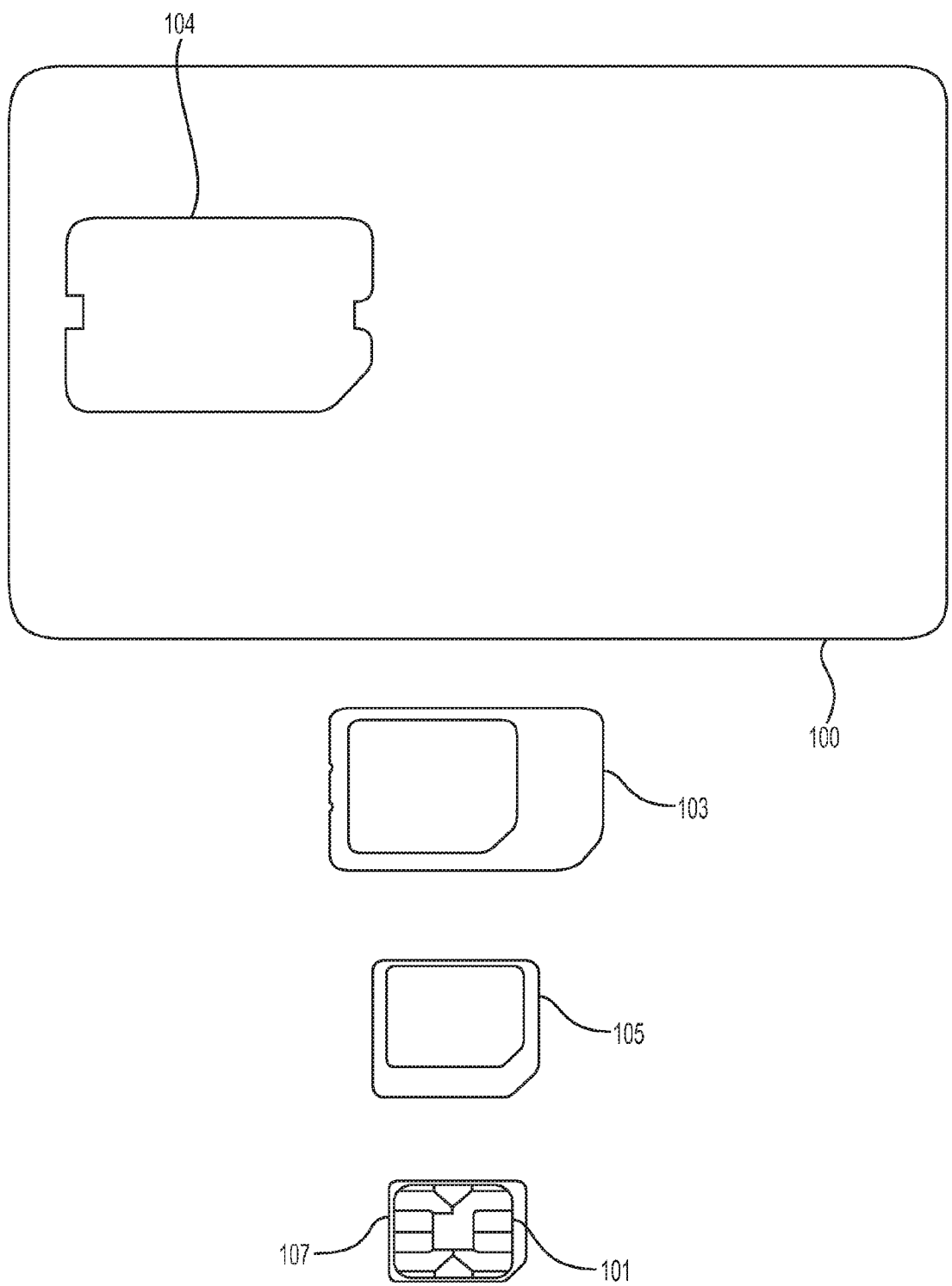
FIG. 1 is a plan view of a ID-1 Format data carrier for a SIM and cutouts corresponding to different form factors.

FIG. 2A illustrates an exemplary embodiment of the invention showing a mini-SIM card 202 having an electrical contact 201 (for either a SIM or UICC) embedded in a card body 200 for a full-size ID-1 Format data carrier. This arrangement is also known as an ID-1/000 Format. Mini-SIM card 202 may be easily removed from cutout 203 of card body 200 using breakable fixing portions 204, 206 that secure SIM card 202 to card body 200. Card body 202 and fixing portions 204, 206 are made of a flexible material so that SIM card 202 is easily bendable from a plane of card body 200 for removal and insertion into a mobile communications device. A mini-SIM (2FF) is shown for exemplary purposes but any reduced-size SIM card form factor is suitable for the invention, such as those shown in FIG. 1 or any future SIM card form factor.

Figure 2B:
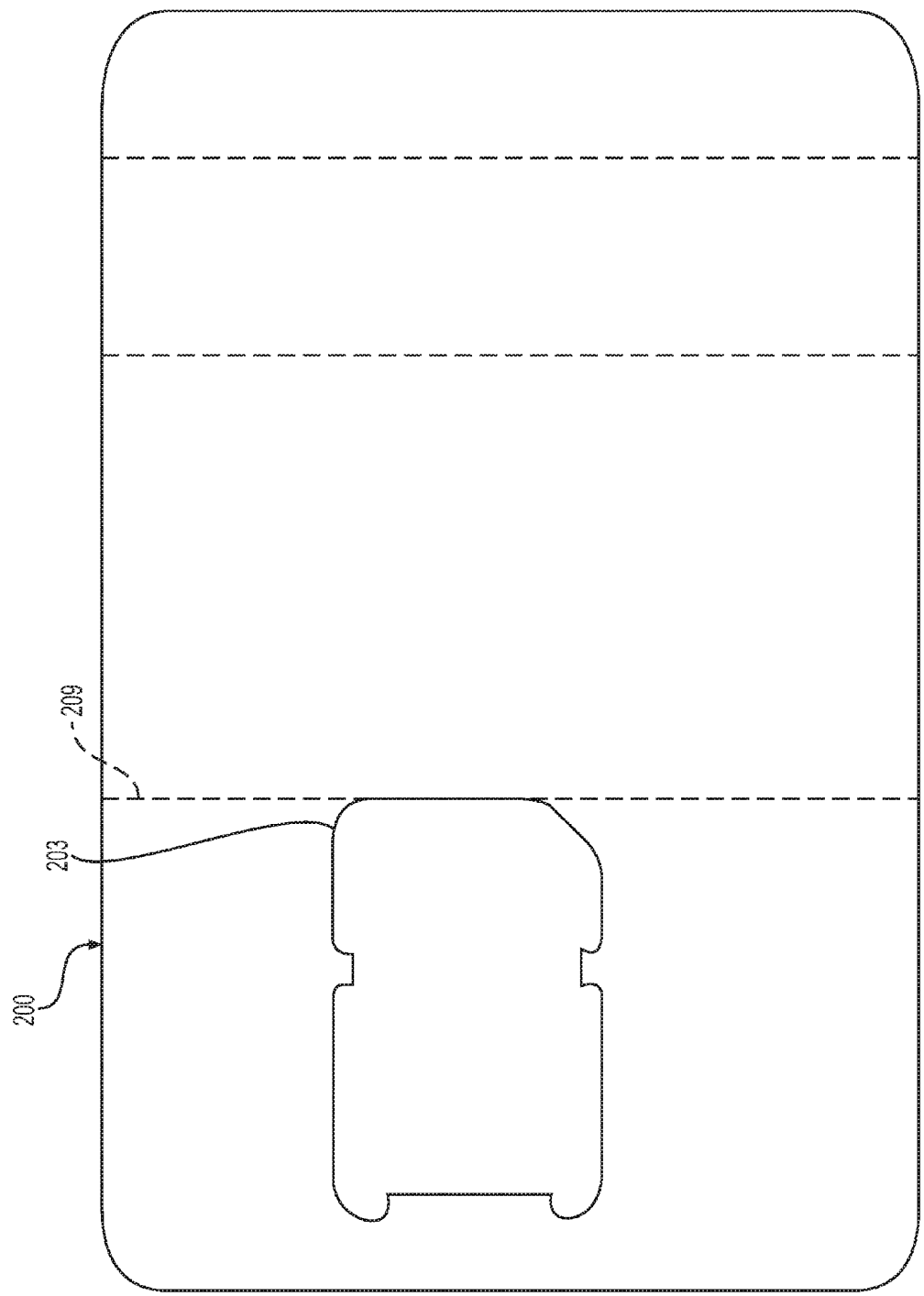
FIG. 2B is a plan view of the data carrier of FIG. 2A with the SIM removed.

Card body 200 may also include a number of pre-formed manipulation lines such as perforations 209, 211, 213, at specific portions of card body 200 configured to permit manipulation of card body 200, such as by bending about the perforations, in order to form a cradle for a mobile communications device. Perforation 209 may be aligned with an end of cutout 203 (or further downstream from cutout 203) such that perforation 209 does not align with cutout 203 where card body 200 can be manipulated by bending along perforation 209. Such an arrangement may facilitate production of card body 200 so that providing perforation 209 will not interfere with SIM card 202. FIG. 2B illustrates card body 200 after removal of SIM card 202 from cutout 203.

Figure 3A:
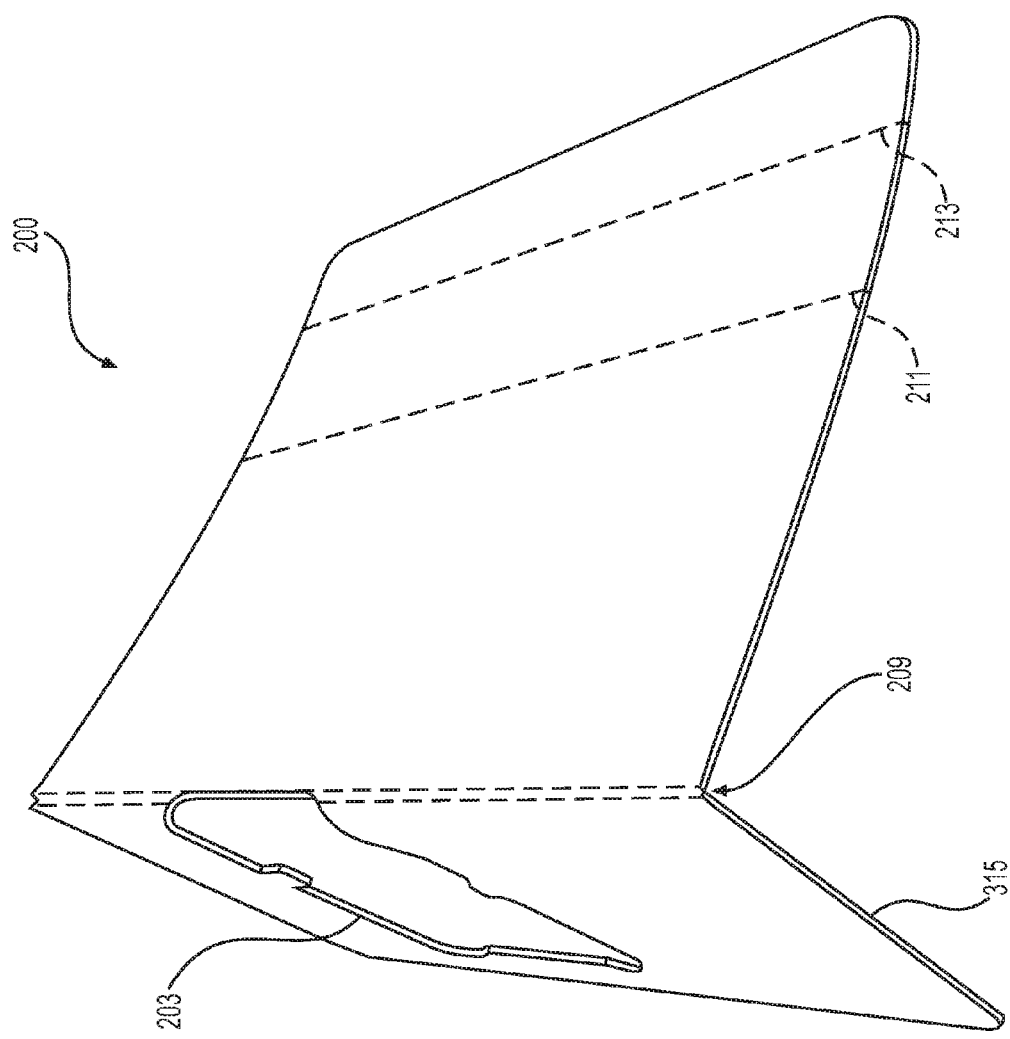
Figure 3B:
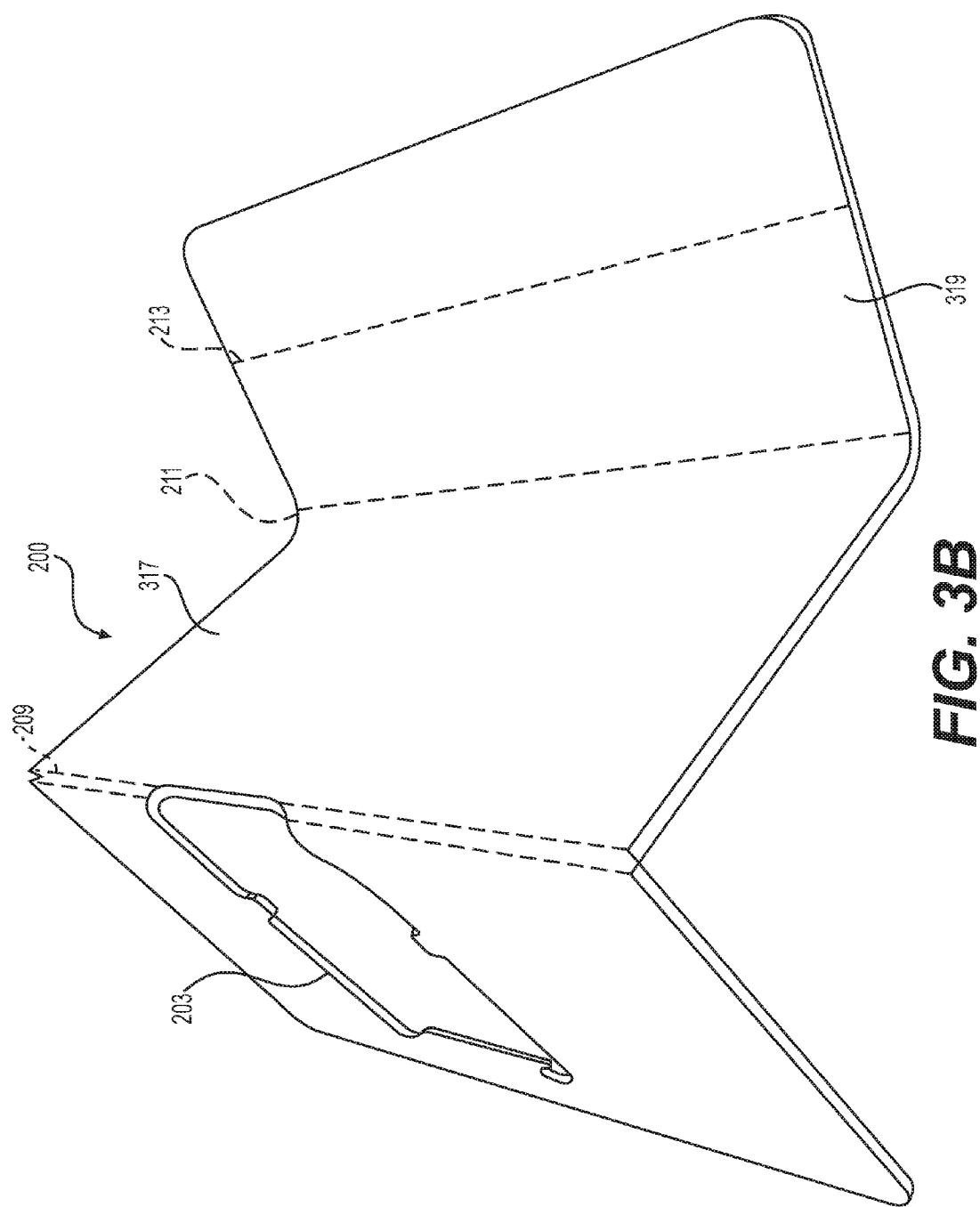

FIGS. 3A-3C show an exemplary embodiment of card body 200 at different stages of the conversion to a cradle for supporting a mobile communications device. FIG. 3A shows card body manipulated (e.g., bent) about perforation 209 to form a stand portion 315 that may be used to form an integral stand for card body 200 when used as a cradle. FIG. 3B shows card body 200 manipulated about perforation 211 to form a first support portion 317 that may be configured to support a rear surface of a mobile communication device opposite its display. In addition, manipulating card body 200 about perforation 211 also may form a second support portion 319 that may be configured to support a side surface of the mobile communication device such that its display can be easily viewed when disposed in the completed cradle. In an exemplary embodiment, perforations 209, 211 may be arranged such that stand portion 315 and first support portion 317 are substantially the same size.

FIG. 3C shows card body 200 manipulated about perforation 213 to form a lip portion 325 and to transform card body 200 into cradle 300. The mobile communications device may be held within cradle 300 between first support portion 317 and lip portion 325. In an exemplary embodiment, a distance between perforations 209, 211 is greater than a depth of the mobile communication device such that a side of the mobile communication device may easily rest on second support portion 319 and fit between first support portion 317 and lip portion 325 within cradle 300. In such an embodiment, a length lip portion 325 is shorter than a length of second support portion 319 such that a display of the mobile communication device disposed within cradle 300 is not significantly obstructed by lip portion 325 to facilitate viewing of the display.

Figure 4A:
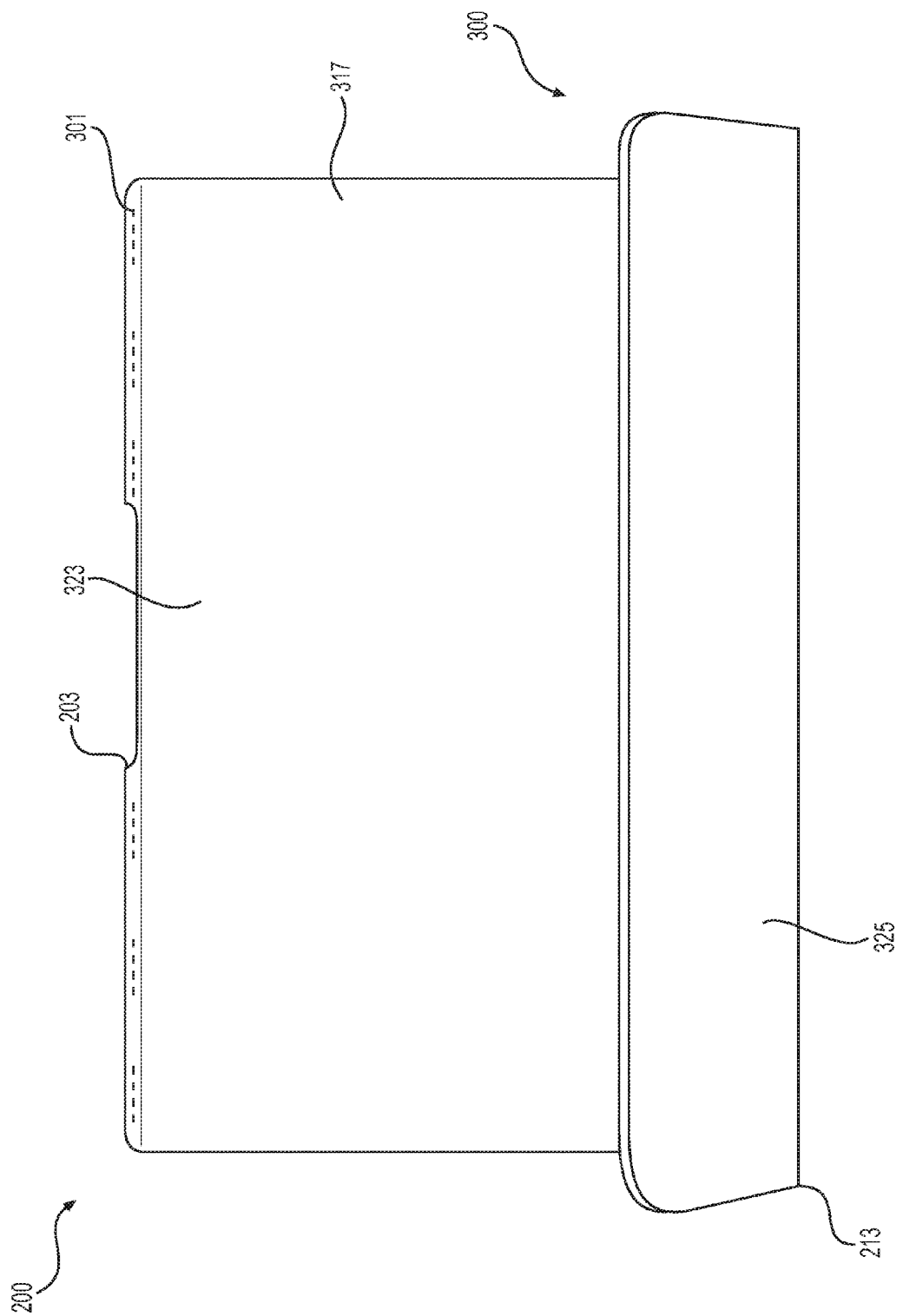
FIG. 4A is a front elevational view of the ID-1 Format data carrier of FIG. 2A converted into a cradle for supporting an mobile communications device.
Figure 4B:
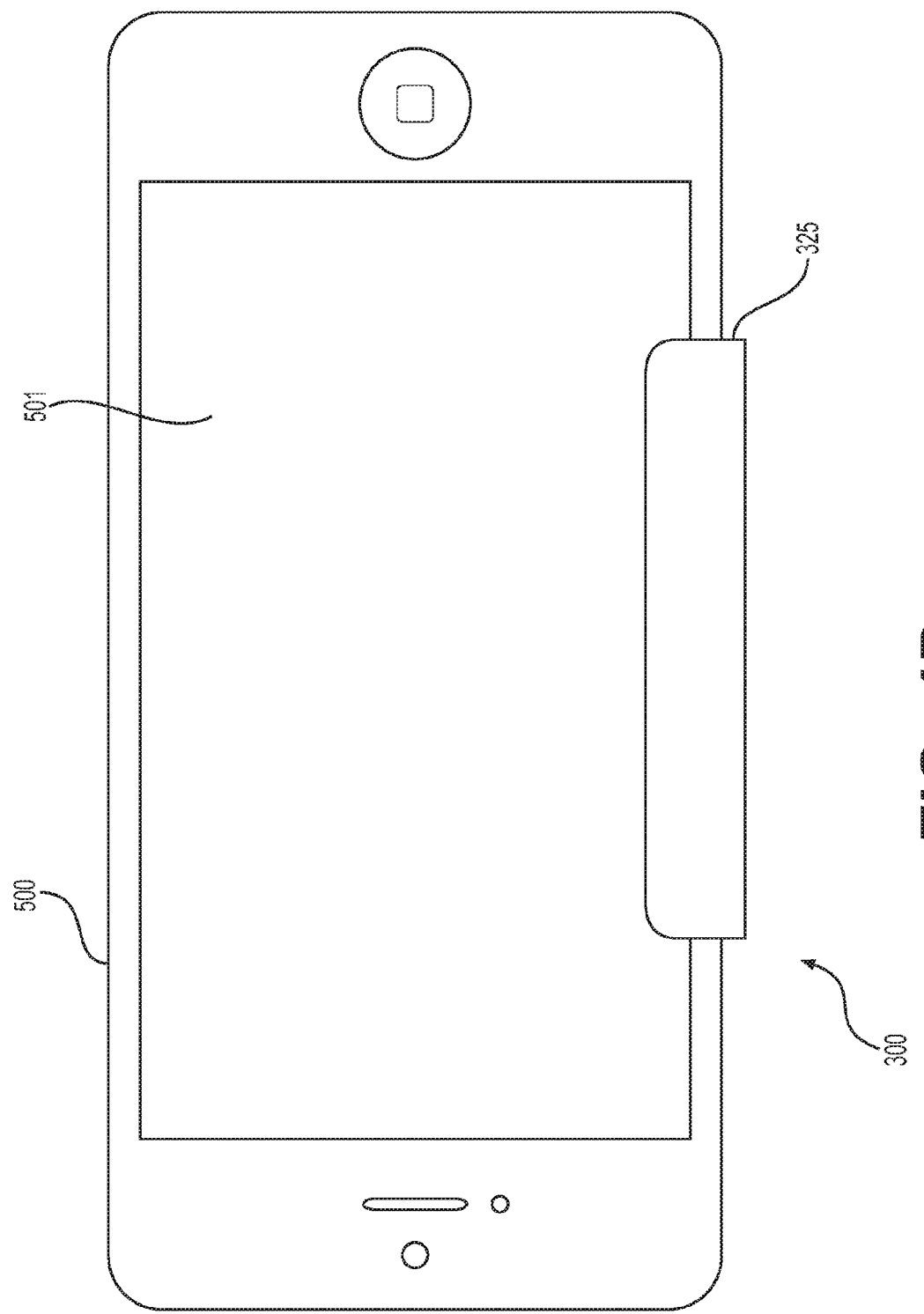
FIG. 4B is a front elevational view of the cradle of FIG. 4A supporting a mobile communications device.

FIG. 4A is a front elevational view of a cradle according to an exemplary embodiment of the invention that illustrates a height of lip portion 325 is less than a distance between perforations 209, 211, and significantly less than a height of first support portion 317. FIG. 4B shows mobile communications device 500 having a display 501 disposed within cradle 300. In the exemplary embodiment of FIGS. 4A and 4B, the illustrated configuration of cradle 300 facilitates viewing of display 501 when a back surface of the mobile communications device 500 is supported in cradle 300 between first support surface 317 and lip portion 325.

Figure 5:
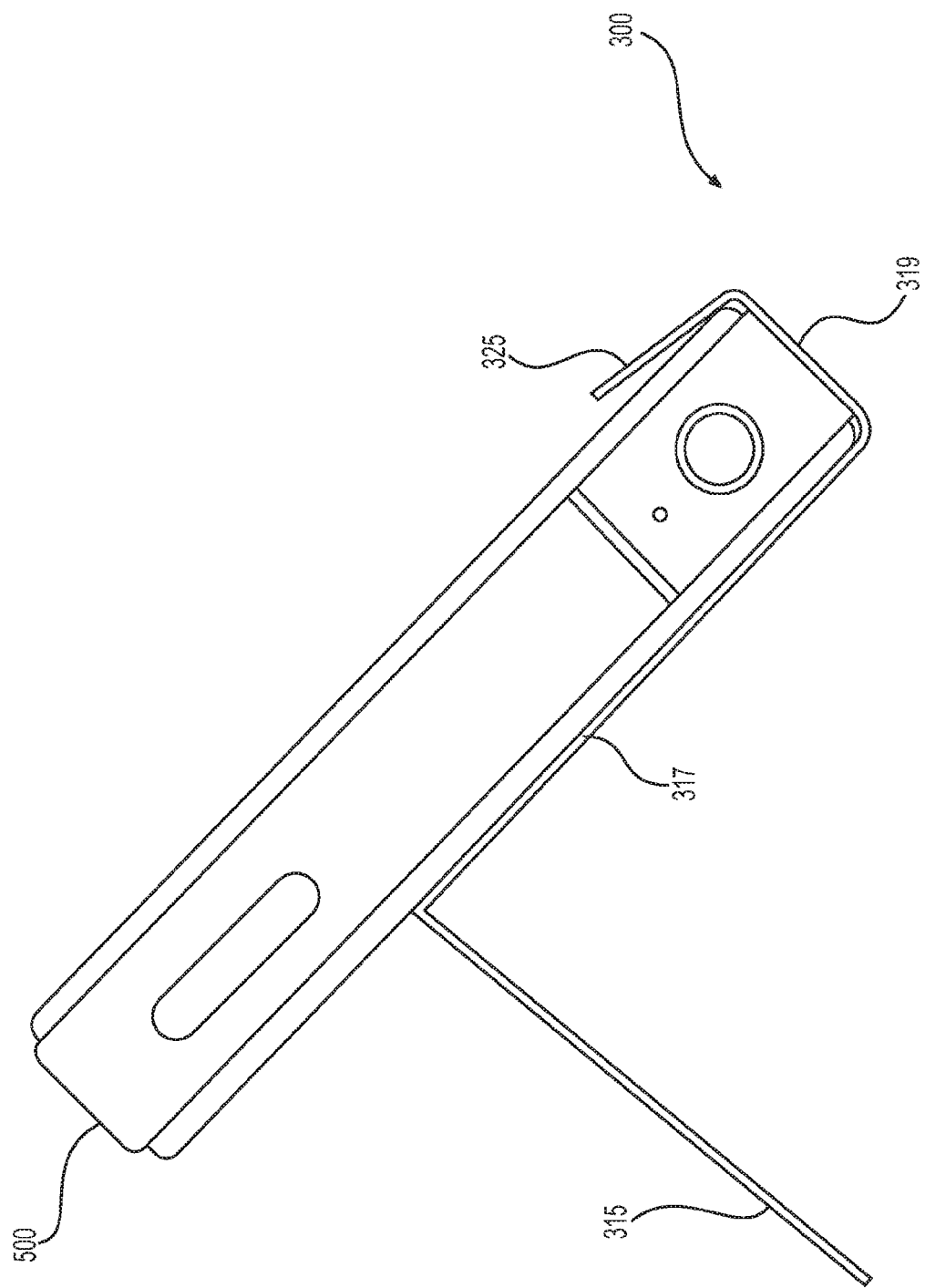
FIG. 5 is a side elevational view of the converted ID-1 Format data carrier of FIG. 4A supporting a mobile communications device.

FIG. 5 illustrates a side elevational view of mobile communications device 500 disposed within cradle 300. Mobile communications device 500 may be securely supported within cradle 300 by first and second surfaces 317, 319 and restricted by lip portion 325 that is configured to prevent mobile communications device 500 from sliding along the sloped surface of first support portion 317. In addition, stand portion 315 may be configured to support mobile communications device 501 in an inclined position to facilitate viewing of display 501. An angle between stand portion 315 and first support portion 317 may be adjusted according to a user's position to achieve optimal viewing of display 501, which is illustrated in a landscape orientation. Nevertheless, the angle between stand portion 315 and first support portion 317 should be no more than 90° to support the inclined mobile communications device 500 adequately and prevent stand portion 315 from returning to its original position aligned with first support portion 317. Similarly, the angle between stand portion 315 and first support portion 317 should be no less than 45° to prevent the weight of mobile communications device 500 from toppling and causing stand portion 315 to bend completely and come into contact with a back portion of first support portion 317. Likewise, another angle between first support portion and second support portion may be in a range from 90° to 135°, and yet another angle between second support portion 319 and lip portion 325 may be less than 120° or lip portion 325 may even be parallel to first support portion 317. These angles are exemplary and the invention is not limited to these specific arrangements.

As shown in FIG. 5, the size of second support portion 319 should be sufficient to permit mobile communications device 500 to fit within cradle 300 formed by first support portion 317, second support portion 319, and lip portion 325. Likewise, the positions of perforations 209, 211, 213 may be adjusted to accommodate a particular type of mobile communications device. In an example of card body 200, perforations 209, 211, 213 may be positioned to accommodate a Samsung Galaxy S5, Apple iPhone 6, or other similarly-sized device such that first support portion 317 may be 30 mm, second support portion 319 may be 13 mm, and lip portion 325 may be 10 mm. This configuration of cradle 300 may be suitable for supporting mobile communications device 500 in a horizontal (landscape) orientation.

Figure 6:
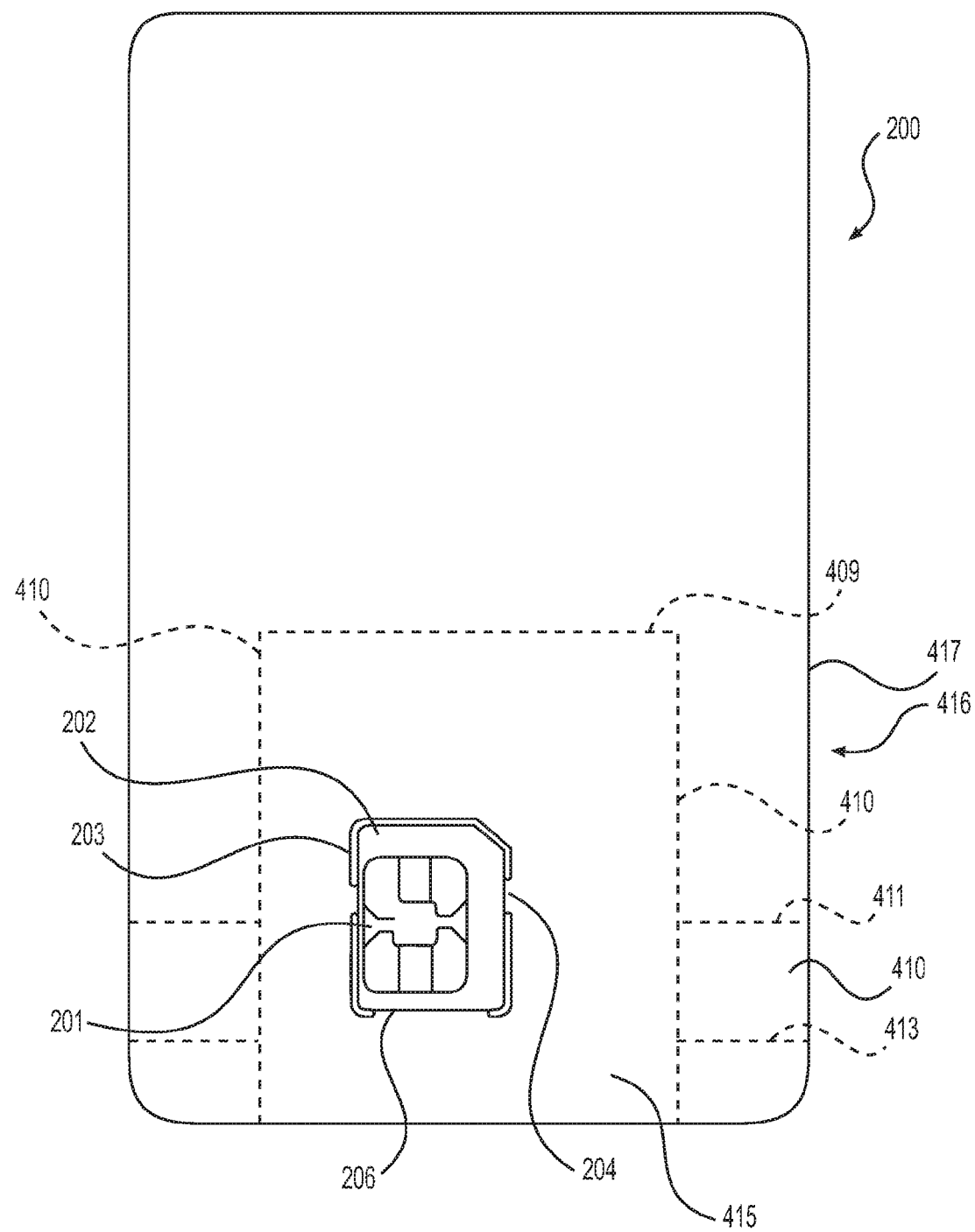
FIG. 6 is a plan view of an ID-1 Format data carrier with an embedded SIM according to an embodiment of the invention.

FIG. 6 illustrates another exemplary embodiment of the invention showing a mini-SIM card 202 having an electrical contact 201 (for either a SIM or UICC) embedded in a card body 200A for a full-size ID-1 Format data carrier. The SIM card 202 may be removed from card body 200A in the same manner as card body 200. Card body 200A differs from card body 200 in that it is arranged for a vertical (portrait) orientation, as described in detail below.

Card body 200A a number of pre-formed manipulation lines such as perforations 409, 411, 413, at specific portions of card body 200A configured to permit manipulation of card body 200, such as by bending about the perforations, in order to form a vertical cradle for a mobile communications device. Perforation 409 does not extend across the entire width of card body 200A and instead is bounded by two supporting portions 416 on opposite sides along vertical perforations 410 that permit a portion of card body 200A to move out of a plane of card body 200A when manipulated about perforation 409 to form a stand portion 415.

Figure 7A:
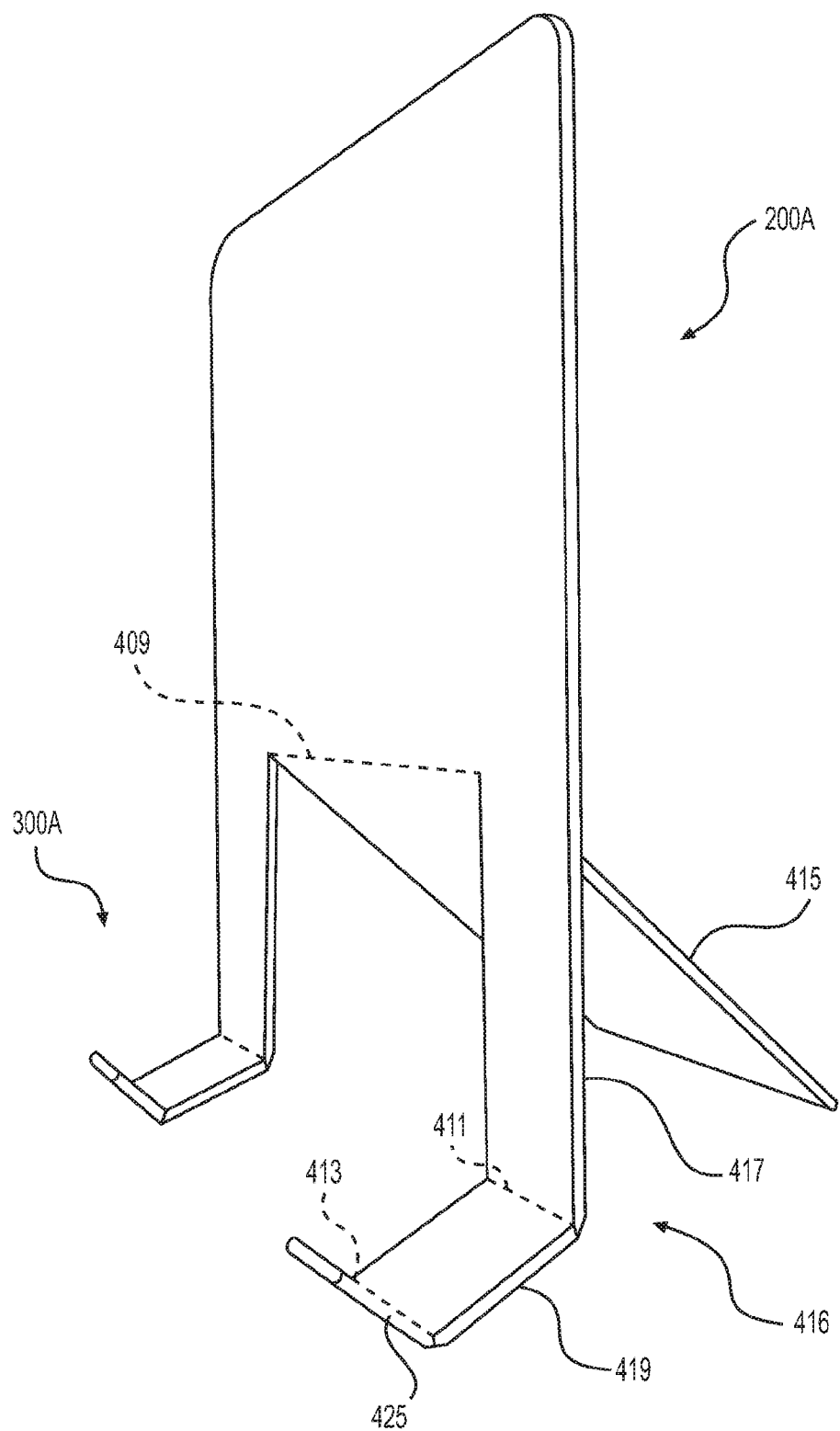
FIGS. 7A and 7B are perspective views of the ID-1 Format data carrier of FIG. 6 converted to a cradle for supporting an electronic mobile device.
Figure 7B:
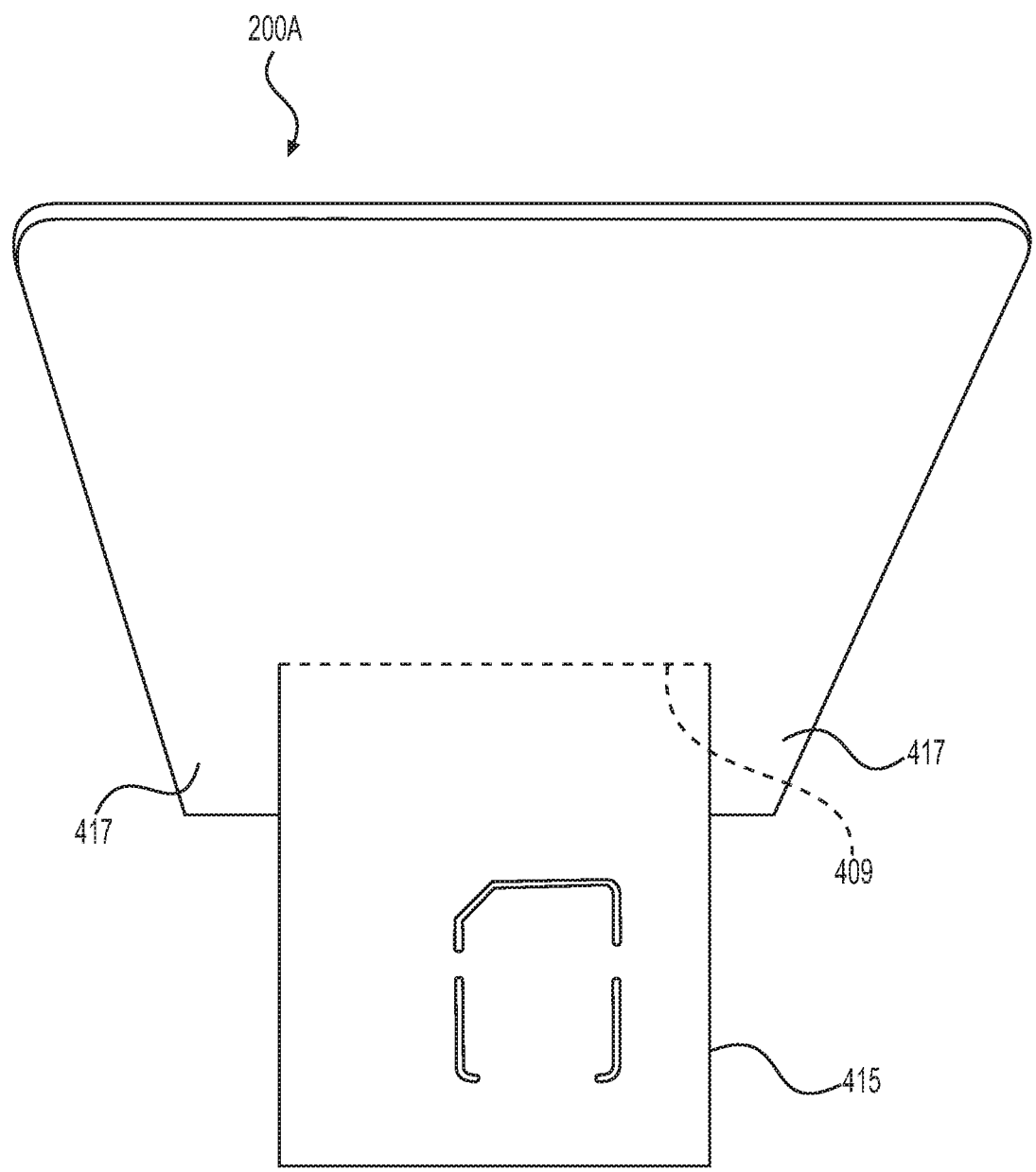

FIGS. 7A and 7B show an exemplary embodiment of card body 200A converted into a vertical cradle 300A for supporting a mobile communications device. When manipulated about perforation 409 and breaking away from vertical perforations 410, stand portion 415 rotates away from card body 200A to form a stand that supports cradle 300A in an upright or vertical position. Each opposing support portion 416 is manipulated about perforations 411, 413 to form a rear support surface 417 configured to support a rear or back surface of a mobile communications device, vertical support surface 419 configured to support a bottom of the device, and a lip portion 425 configured to hold the device between rear support surface 417 and lip portion 425 within cradle 300A.

Once again, the positions of perforations 409, 411, 413 and the length of vertical perforations 410 may be adjusted to accommodate a particular type of mobile communications device. In an example of card body 200A, perforations 409, 411, 413 may be positioned to accommodate a Samsung Galaxy S5, Apple iPhone 6, or other similarly-sized device such that rear support surface 417 may be 25 mm, vertical support surface 419 may be 10 mm, and lip portion 425 may be 5 mm. Moreover, the width of support portions may be 10 mm to provide sufficient width of stand portion 415 to support these types of devices in a vertical (portrait) orientation. This configuration of cradle 300A may be suitable for supporting a mobile communications device in a vertical horizontal orientation such that the screen of the device may be easily viewed when secured within cradle 300A. For this reason, the length of lip portion 425 may be less than the vertical support portion 419, and the combined length of portions 419, 425 may be less than the length of rear support portion.

Figure 8A:
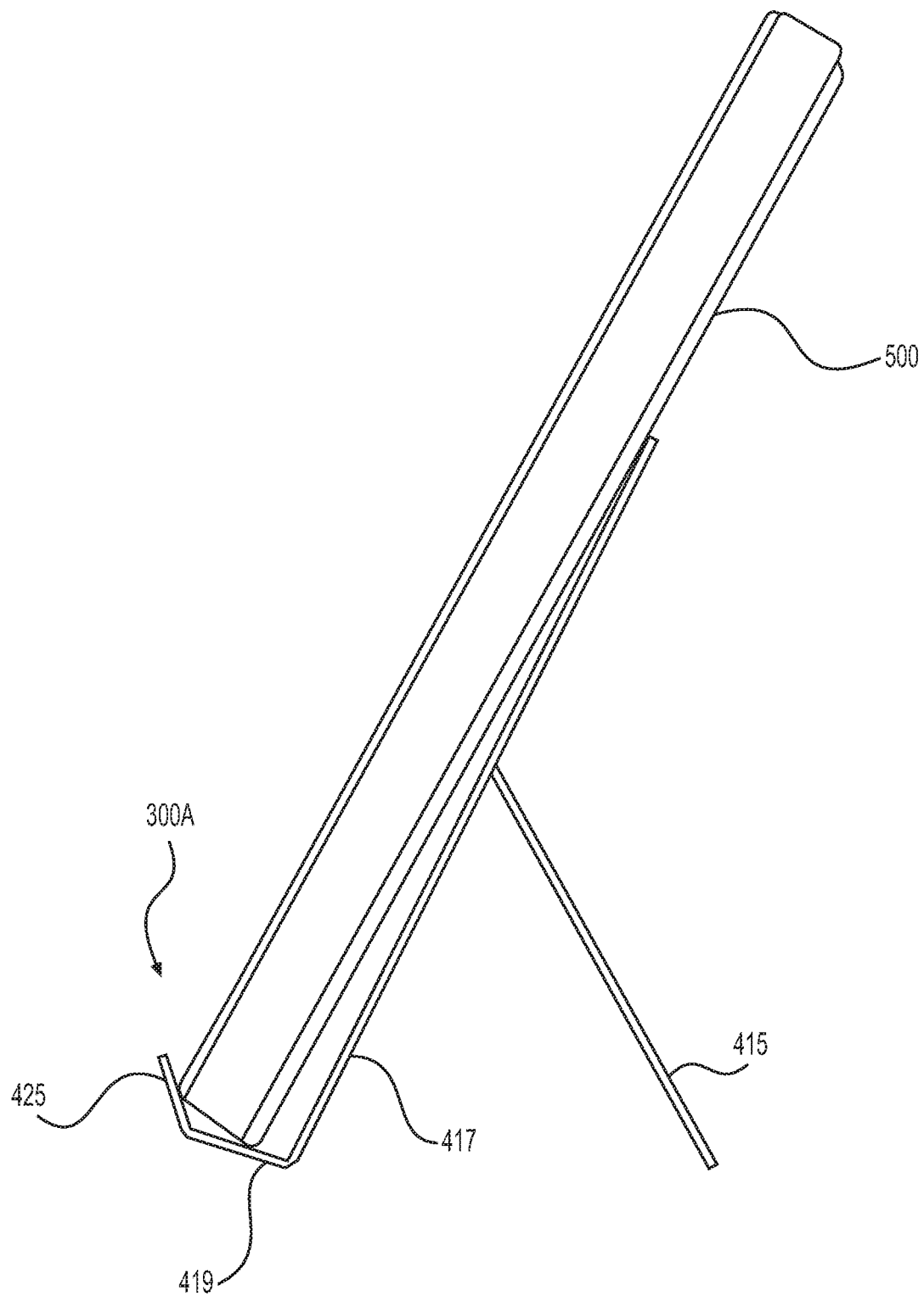
FIGS. 8A and 8B are a side and front elevational views of the cradle of FIGS. 7A and 7B supporting a mobile communications device.
Figure 8B:
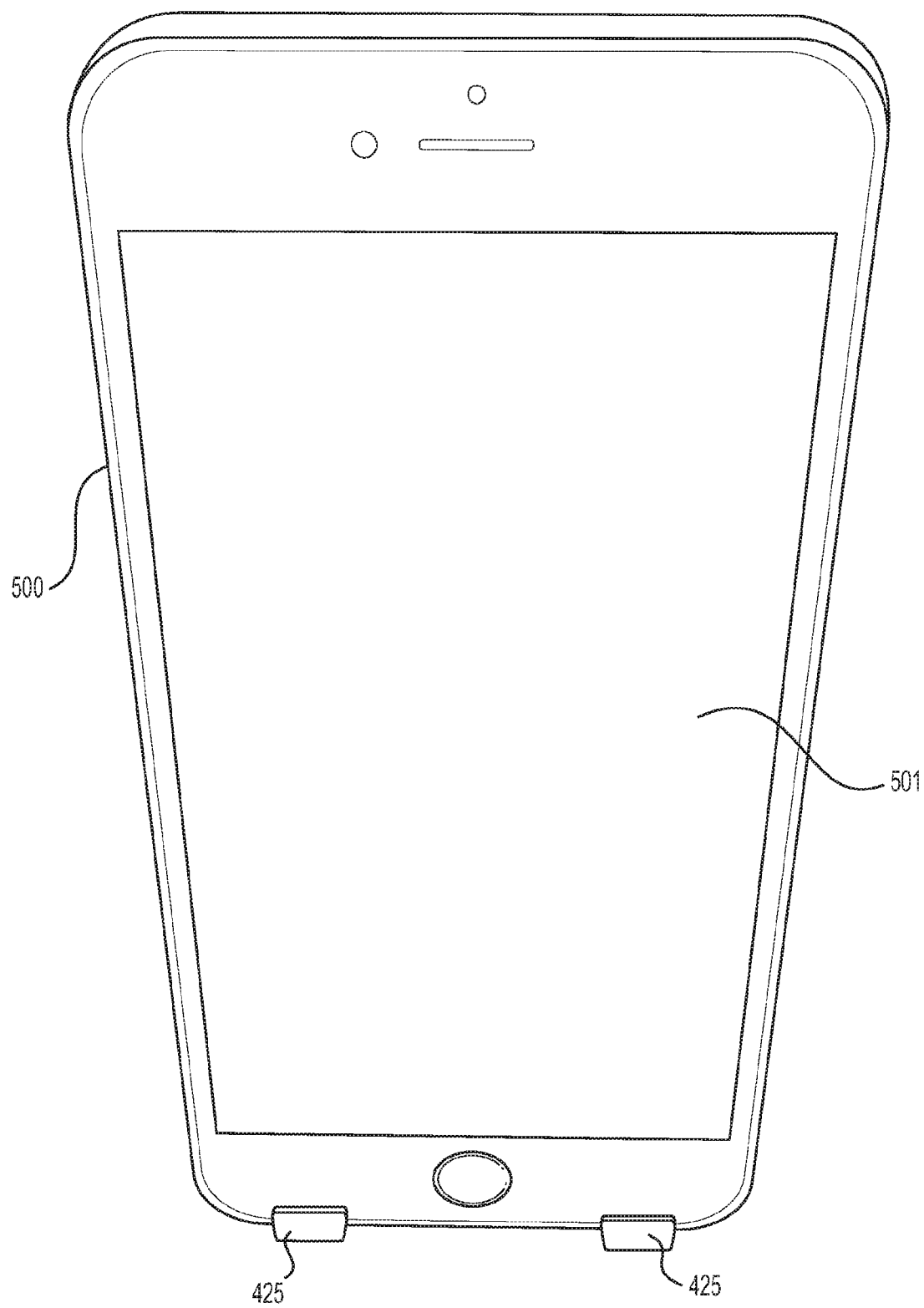

FIGS. 8A and 8B illustrate elevational views of mobile communications device 500 disposed within cradle 300A in a portrait orientation. Mobile communications device 500 may be securely supported within cradle 300A by rear and vertical support surfaces 417, 419 and restricted by lip portion 425. Stand portion 415 may be configured to support mobile communications device 501 in an inclined position to facilitate viewing of display 501, such that the angle between stand portion 415 and rear support surfaces 417 may be adjusted to achieve optimal viewing of display 501.

The angle between stand portion 415 and rear support surfaces 417 should be no less than 45° to support the inclined mobile communications device 500 adequately and prevent cradle 300A from tipping over. Similarly, the angle between stand portion 415 and rear support surfaces 417 should be no more than 60° to prevent the weight of mobile communications device 500 from causing stand portion 415 to bend completely about perforation 409 such that the rear surface of mobile communication device will no longer be inclined and lay flat. Likewise, another angle between rear support surface 417 and vertical support surface 419 may be in a range from 100° to 135°, and yet another angle between vertical support surface 419 and lip portion 425 may be in a range from 120° to 135° or lip portion 425 may even be parallel to rear support surface 417. Again, these angles are exemplary and the invention is not limited to these specific arrangements.

Figure 9:
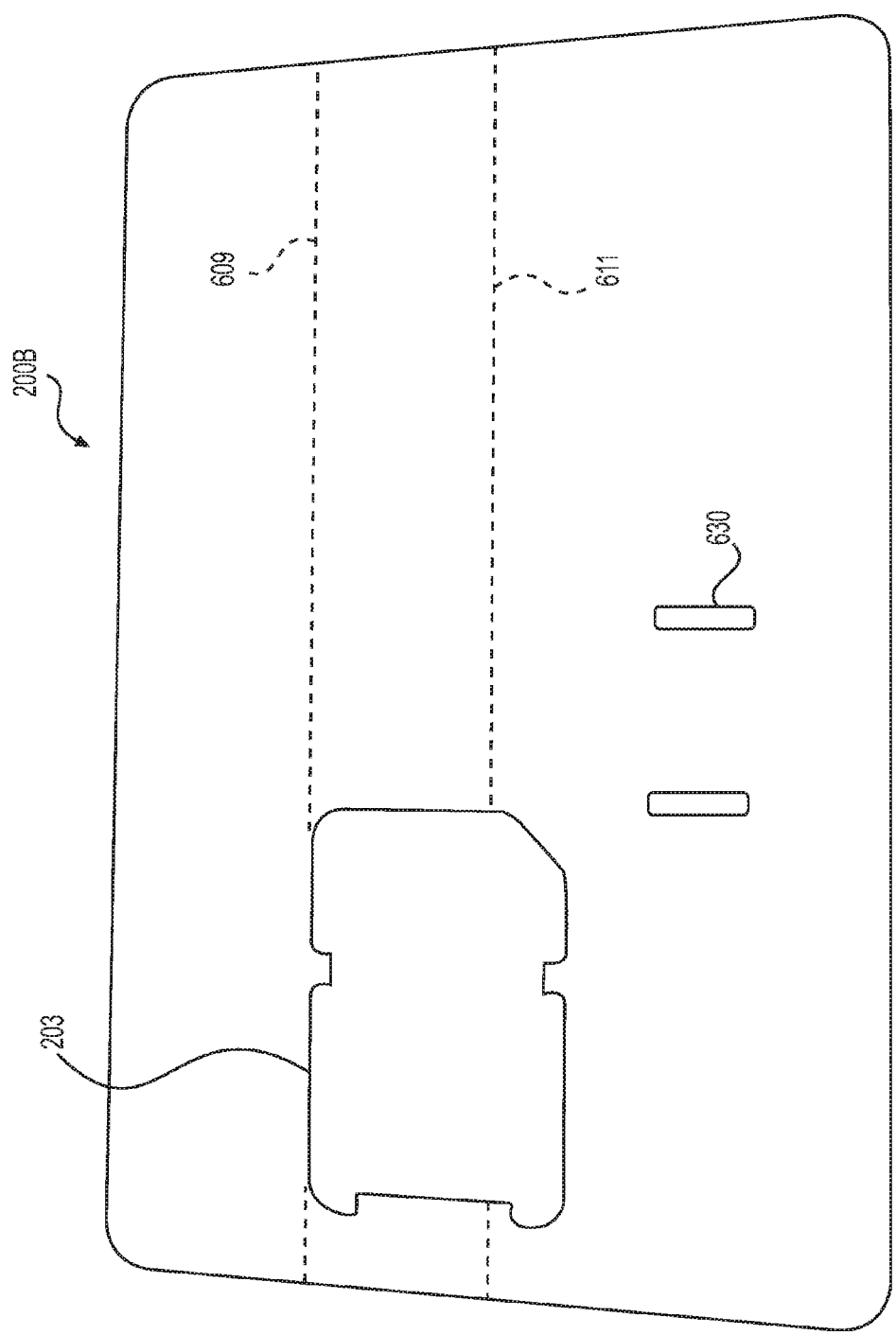
FIG. 9 is a plan view of an ID-1 Format data carrier having the SIM removed from the cutout according to an embodiment of the invention.

FIG. 9 illustrates another exemplary embodiment of the invention showing a card body 200B for a full-size ID-1 Format data carrier. Here, SIM card 202 is removed from cutout 203 of card body 200A as described above with regard to card body 200. Card body 200B differs from card body 200 in that it is arranged in a charging configuration, as described in detail below.

Card body 200B includes perforations 609, 611 extending in a lengthwise direction at specific portions of card body 200B. Perforations 609, 611 are configured to permit manipulation of card body 200B, such as by bending about the perforations, in order to form a charging cradle for a mobile communications device. Card body 200B also includes charging apertures 630 to accommodate the prongs of an electrical power plug disposed in a support portion 616 of card body 200B. Here, apertures for a two-prong 110V plug (NEMA 1-15 ungrounded (Type A)) for the United States are utilized, but the apertures may be adapted to be suitable for other plug/outlet combinations (e.g., NEMA 5-15 grounded (Type B), CEE 7-type, JIS, etc.). As in the case of perforation 209, perforation 609 may be aligned with an end of cutout 203 so as to not interfere with SIM Card 202 but perforation 609 is aligned along a lengthwise direction of card body 200B rather than the widthwise direction.

Figure 10A:
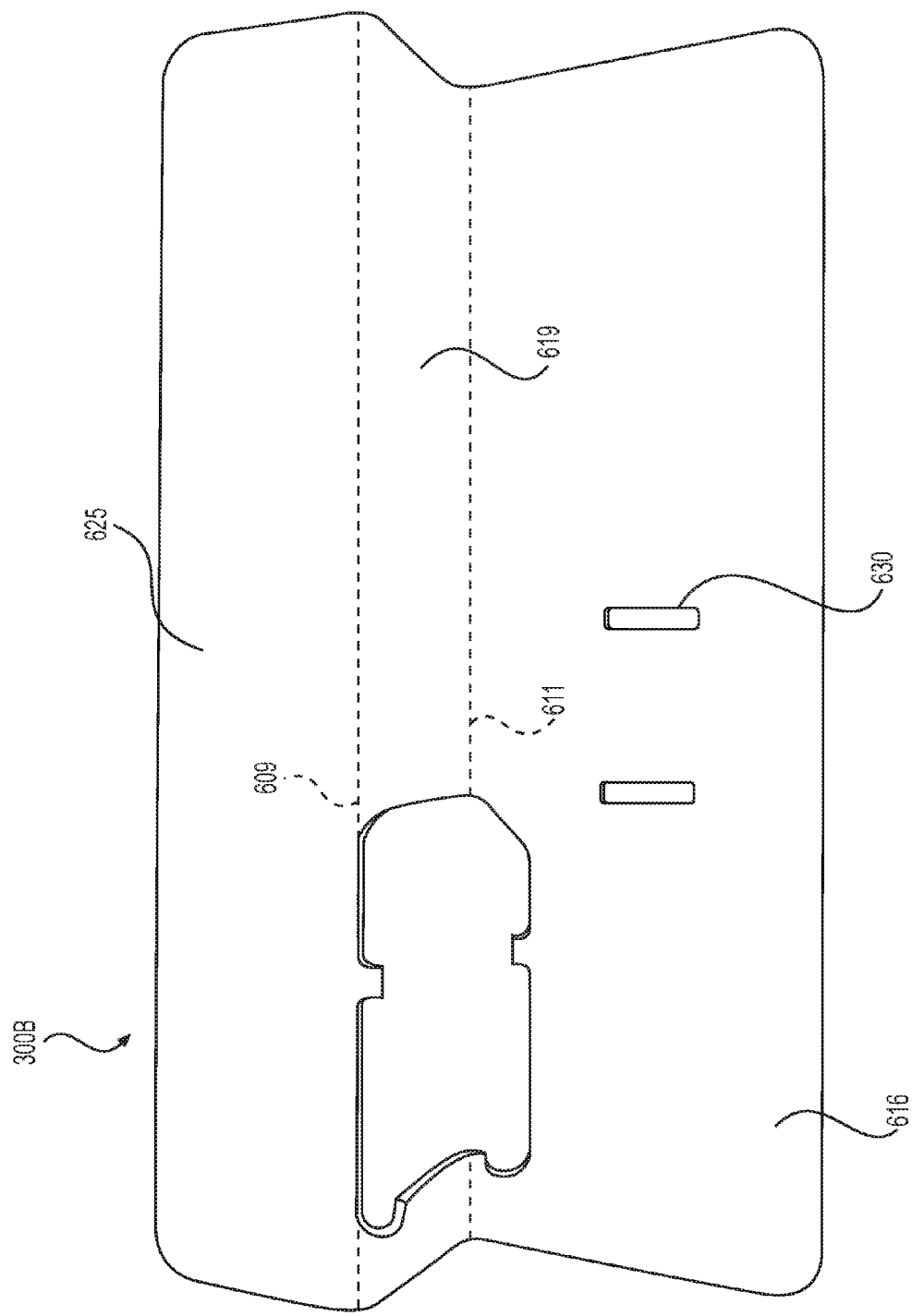
FIG. 10A is an elevational view of the ID-1 Format data carrier of FIG. 9 converted to a cradle for supporting an electronic mobile device.
Figure 10B:
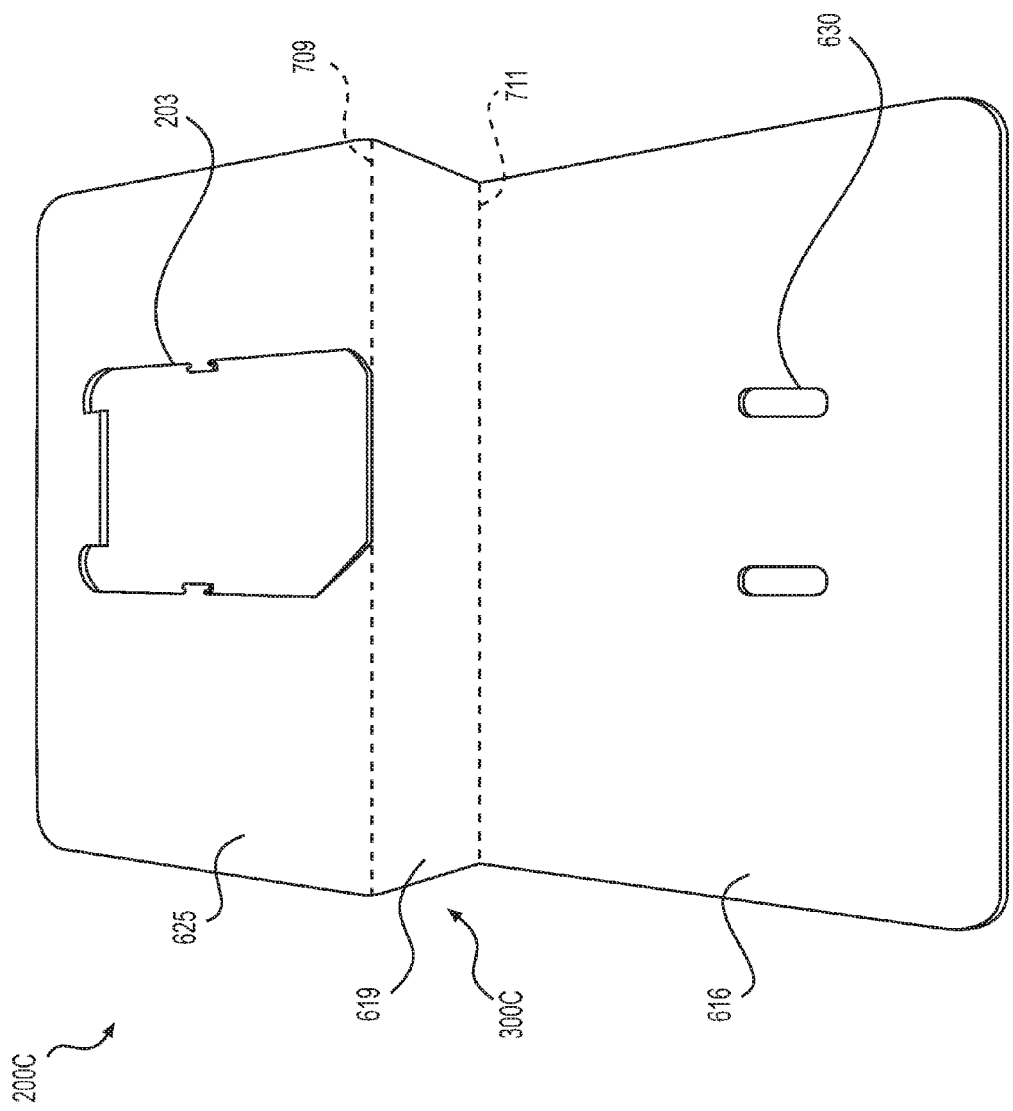
FIG. 10B is an elevational view of an alternative ID-1 Format data carrier converted to a cradle for supporting an electronic mobile device.

FIG. 10A shows an exemplary embodiment of card body 200A converted into a vertical cradle 300B for supporting a mobile communications device. Card body 200B is manipulated along perforations 609, 611 to form a lip portion 625 and vertical support surface 619 configured to support the mobile communication device in the vertical direction. A width of vertical support surface 619 should be greater than a depth of the mobile communication device being supported with cradle 300B. Alternatively, FIG. 10B shows perforations 709, 711 may extend in a widthwise direction of card body 200C to form cradle 300C and may be manipulated similarly as perforations 609, 611 of card body 200B to form cradle 300B. Perforation 709 may be aligned with an end of cutout 203 the widthwise direction so as to not interfere with SIM Card 202.

Figure 11:
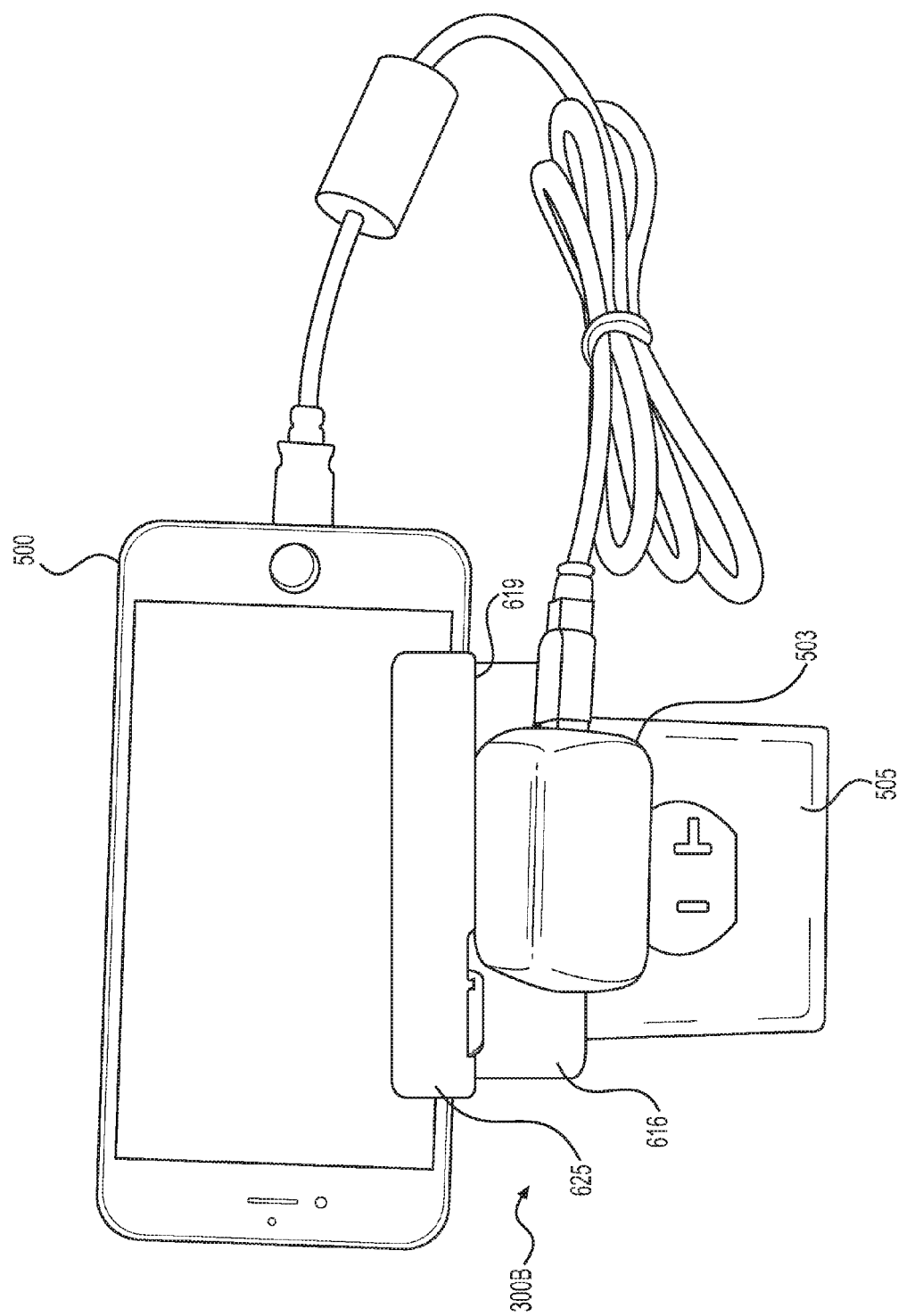
FIG. 11 is a front elevational view of the cradle of FIG. 10A supporting a mobile communications device in a charging configuration.

FIG. 11 illustrates an elevational view of mobile communications device 500 disposed within cradle 300B of FIG. 10A in a charging configuration. A Plug 503 is connected to device 500 such that plug is inserted through aperture 630 into outlet 505 to secure support portion 616 of card body 200B. Mobile communications device 500 is held within cradle 300B by lip portion 625 and a wall surface in which outlet 625 is disposed. Also, mobile communications device 500 is supported in a vertical direction by vertical support surface 619. The angle formed between lip portion 625 and vertical support surface 619 and the angle formed between vertical support surface 619 and support portion 616 may be approximately 90°.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. For example, while the illustrated embodiments describe using a card body carrying a SIM card, other plastic card bodies may be suitable for carrying out the invention. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A data carrier configured for conversion into a cradle configured to support a mobile communications device, the data carrier comprising:
a card body comprising a first end and a second end along a particular direction and a first side and a second side along a further direction, the card body comprising:
a cutout disposed closer to the first end than the second end along the particular direction;
a first manipulation line extending along the further direction at a position downstream of the cutout relative to the first end in the particular direction, the first manipulation line defining a stand portion extending from the first end to the first manipulation line, the first manipulation line is less than a width of the card body and overlaps a center axis of the card body along a length of the card body;
a pair of support portions on opposite ends of the stand portion along the further direction, each the support portions include a rear support surface that is configured to be fixed relative to a manipulation of the stand portion along the first manipulation line, a length of each of the support portions is defined by a respective vertical manipulation line defining the stand portion in the particular direction, each of the support portions comprises:
a second manipulation line extending along the further direction of the card body upstream of the first manipulation line relative to the first end in the particular direction;
a third manipulation line extending along the further direction of the card body upstream of the second manipulation line relative to the first end in the particular direction, the third manipulation line defining a lip portion extending from the third manipulation line to the first end, a length of the lip portion is less than a length of the vertical support surface,
wherein the lip portion extends from the third manipulation line to the first end along the particular direction, and the vertical support surface extends from the second manipulation line to the third manipulation line along the particular direction; and
a removable SIM card disposed within the cutout, the removable SIM card connected to the card body by at least one fixing portion,
wherein the card body is configured to be manipulated about the first manipulation line so that the stand portion forms a stand such that an end of the stand portion proximate the first manipulation line is elevated relative to the first end of the card body,
wherein the card body is configured to be manipulated about the second manipulation line so that each of the vertical support surfaces is configured to support a bottom surface of the mobile communications device and each of the rear support surfaces is configured to support a rear surface of the mobile communications device, and
wherein the card body is configured to be manipulated about the third manipulation line so that the lip portion is configured to secure the mobile communications device within the cradle formed by the rear support surfaces, the vertical support surfaces, and the lip portions.

2. The data carrier according to claim 1, wherein the pair of support portions are substantially the same width.

3. The data carrier according to claim 2, wherein a length of the stand portion is substantially same as a length of the pair of support portions.

4. The data carrier according to claim 1, wherein a size of the card body is the ID-1 format.

5. The data carrier according to claim 1, wherein a size of the SIM card is one of a micro-SIM (3FF) format and a nano-sim (4FF) format.

6. The data carrier according to claim 1, wherein the first manipulation line is configured to be manipulated to form an angle of at least 45 degrees between the stand portion and rear support surfaces.

7. The data carrier according to claim 6, wherein each of the second manipulation lines is configured to be manipulated to form an angle in a range from 100 to 135 degrees between the rear support surface and the vertical support surface.

8. The data carrier according to claim 7, wherein each of the third manipulation lines is configured to be manipulated to form an angle in a range from 120 to 135 between the vertical support surface and the lip portion.

9. A method of forming a cradle for supporting a mobile communications device from a data carrier comprising a card body, the method comprising:
providing the card body comprising a first end and a second end along a particular direction and a first side and a second side along a further direction, the card body comprising:
a cutout disposed closer to the first end than the second end along the particular direction;
a first manipulation line extending along the further direction at a position downstream of the cutout relative to the first end in the particular direction, the first manipulation line defining a stand portion extending from the first end to the first manipulation line, the first manipulation line is less than a width of the card body and overlaps a center axis of the card body along a length of the card body;

a pair of support portions on opposite ends of the stand portion along the further direction, each the support portions include a rear support surface that is configured to be fixed relative to a manipulation of the stand portion along the first manipulation line, a length of each of the support portions is defined by a respective vertical manipulation line defining the stand portion in the particular direction, each of the support portions comprises:
  a second manipulation line extending along the further direction of the card body upstream of the first manipulation line relative to the first end in the particular direction;
  a third manipulation line extending along the further direction of the card body upstream of the second manipulation line relative to the first end in the particular direction, a length of the lip portion is less than a length of the vertical support surface,
  wherein the lip portion extends from the third manipulation line to the first end along the particular direction, and the vertical support surface extends from the second manipulation line to the third manipulation line along the particular direction; and
 a removable SIM card disposed within the cutout of the stand portion, the removable SIM card connected to the card body by at least one fixing portion;
manipulating the card body about the first manipulation line to form a stand with the stand portion wherein an end of the stand portion proximate the first manipulation line is elevated relative to the first end of the card body;
manipulating the card body about the second manipulation line so that each of the vertical support surfaces is configured to support a bottom surface of the mobile communications device and each of the rear support surfaces is configured to support a rear surface of the mobile communications device, and
manipulating the card body about the third manipulation line so that the lip portion is configured to secure the mobile communications device within the cradle formed by the rear support surfaces, the vertical support surfaces, and the lip portions.

10. The method of claim 9, wherein the data carrier further comprises a removable SIM card disposed within a cutout of the card body disposed within the stand portion, the removable SIM card connected to the card body by at least one fixing portion.

11. The method of claim 10, further comprising:
removing the removable SIM card from the card body by breaking the at least one fixing portion,
wherein the removing step is performed before performing the steps of manipulating the card body about the first, second, and, third manipulation lines.

12. The method of claim 11, wherein a length of the stand portion is substantially same as the length of each of the pair support portions.

13. The method of claim 11, wherein a size of the card body is the ID-1 format.

14. The method of claim 13, wherein a size of the SIM card is one of a micro-SIM (3FF) format and a nano-sim (4FF) format.

15. The method of claim 9, wherein the card body is manipulated about the first manipulation line to form an angle of at least 45 degrees between the stand portion and the rear support surfaces of the respective pair of support portions.

16. The method of claim 15, wherein the card body is manipulated about each second manipulation line to form an angle in a range from 100 to 135 degrees between the each of the rear support surfaces and the vertical support surfaces.

17. The method of claim 16, wherein the card body is manipulated about the third manipulation line to form an angle in a range from 120 to 135 degrees between each of the vertical support surfaces and the lip portions.

18. A method of forming a charging cradle for a mobile communications device from a data carrier comprising a card body, the method comprising:
providing the card body comprising a first end and a second end along a particular direction and a first side and a second side along a further direction, the card body comprising:
  a support surface including a plug accommodation portion configured to permit prongs of a power plug to pass through the card body into an electrical outlet;
  a cutout, the cutout disposed closer to the second side of the card body than the plug accommodation portion along the further direction;
  a first manipulation line extending along the particular direction at a position of the card body at or beyond an end of the cutout opposite the first side, the first manipulation line defining a lip portion extending from the first manipulation line to the second side, and
  a second manipulation line extending along the particular direction at a position of the card body closer to the first side than the first manipulation line along the further direction, the second manipulation line defining a vertical support surface extending from the first manipulation line to the second manipulation line;
manipulating the card body about the first manipulation line to form the lip portion configured to hold a mobile communications device between the lip portion and a surface in which the electrical outlet is disposed;
manipulating the card body about the second manipulation line so that the vertical support surface is configured to support a side of the mobile communications device between the electrical outlet surface and the lop portion;
connecting the power plug to the mobile communications device; and
inserting the prongs of the power plug through the plug accommodation portion to electrically connect the mobile communications device to the electrical outlet,
wherein the support portion is secured between the electrical outlet and the power plug to support the mobile communications device at an elevated position above the prongs plugged into the electrical outlet.

19. The method of claim 18, wherein the card body is manipulated about the first manipulation line to form an angle of approximately 90 degrees between the lip portion and the vertical support surface, and
wherein the card body is manipulated about the second manipulation line to form an angle of approximately 90 degrees between the vertical support surface and the support portion.

20. The method of claim 18, wherein the plug accommodation portion is configured to permit prongs of a NEMA 5-15 type grounded power plug to pass through the card body into the electrical outlet.

* * * * *